US012576497B1

(12) United States Patent
Gong

(10) Patent No.: US 12,576,497 B1
(45) Date of Patent: Mar. 17, 2026

(54) MANUAL PRESS-FIT TOOL

(71) Applicant: Jie Gong, Changde (CN)

(72) Inventor: Jie Gong, Changde (CN)

( * ) Notice: Subject to any disclaimer, the term of this patent is extended or adjusted under 35 U.S.C. 154(b) by 17 days.

(21) Appl. No.: 18/952,007

(22) Filed: Nov. 19, 2024

(30) Foreign Application Priority Data

Oct. 31, 2024 (CN) ......................... 202422653888.0

(51) Int. Cl.
*B25F 1/00* (2006.01)

(52) U.S. Cl.
CPC .................................... *B25F 1/003* (2013.01)

(58) Field of Classification Search
CPC .... B25F 1/003; B25F 1/02; B25F 1/04; B25B 7/02; B25B 7/04; B25B 7/06; B25B 7/08; B25B 7/12; B25B 7/14; B25B 7/20; B25B 7/22; B25B 27/02; B25B 27/14; B25B 31/00; B25C 1/02; A41H 37/006; A41H 37/04; B26F 1/02; B26F 1/36; B26F 2001/365
See application file for complete search history.

(56) References Cited

U.S. PATENT DOCUMENTS 851,794 A * 4/1907 Bernard .................... B25B 7/02 81/424
2,575,630 A * 11/1951 Klenk .................... B28D 1/223 30/252
3,398,445 A * 8/1968 Westendorf ........ H05K 13/0007 29/283

FOREIGN PATENT DOCUMENTS

CN 110315461 A 10/2019
CN 219050317 U 5/2023
CN 220699476 U 4/2024

* cited by examiner

*Primary Examiner* — Robert J Scruggs
(74) *Attorney, Agent, or Firm* — Nitin Kaushik

(57) ABSTRACT

The present invention discloses a manual press-fit tool. The manual press-fit tool includes: a handle assembly; a connecting assembly, connected to the handle assembly; a support platform, detachably disposed on the connecting assembly; a press-fit assembly, movably disposed on the connecting assembly in a penetrating manner and disposed opposite to the support platform; and a punching assembly, where one end of the punching assembly is in transmission connection with the handle assembly, and the other end thereof is in transmission connection with the press-fit assembly. The handle assembly is pressed to sequentially drive the punching assembly and the press-fit assembly to move. According to the present invention, the connecting assembly limits and guides the press-fit assembly, so that concentricity of the press-fit assembly and the support platform matched to perform press-fitting is ensured.

10 Claims, 8 Drawing Sheets

MANUAL PRESS-FIT TOOL

CROSS-REFERENCE TO RELATED APPLICATIONS

The application claims priority to Chinese patent application No. 2024226538880, filed on Oct. 31, 2024, the entire contents of which are incorporated herein by reference.

TECHNICAL FIELD

The present invention relates to the technical field of press-fit tools, and specifically, to a manual press-fit tool.

BACKGROUND

A button plier, also known as a pressing plier, is an assembly tool for objects, which is mainly used for pressing shoe buttonholes, buttons, belt buttonholes, and the like. In society today, there are various types of buttonholes that need to be pressed, but a common button plier is fixed and can only be used for one type of object that needs to be pressed, causing that the button plier cannot be used for pressing objects of different specifications, and it is necessary to purchase a button plier of another specification. This may cause a user to purchase a whole set of button pliers to meet production or life needs, which not only causes a waste of resources, but also increases production costs to a certain extent, and brings great difficulties in storage at the same time. Meanwhile, an existing pressing plier generally adopts two plier bodies to respectively drive two press-fit portions for clamping and press-fitting, which may make the concentricity of the two press-fit portions inconsistent, thereby resulting in press-fit offset of a mounting member. Meanwhile, the existing pressing plier has a single function and generally does not have a punching function. Therefore, a manual press-fit tool is provided to solve the above problems.

SUMMARY

A purpose of the present invention is to provide a manual press-fit tool, so as to solve a problem that an existing press-fit tool has a relatively single function.

The manual press-fit tool of the present invention may be implemented through the following technical solutions:

The manual press-fit tool of the present invention includes: a handle assembly; a connecting assembly, connected to the handle assembly; a support platform, detachably disposed on the connecting assembly; a press-fit assembly, movably disposed on the connecting assembly in a penetrating manner and disposed opposite to the support platform, where the connecting assembly limits and guides the press-fit assembly; and a punching assembly, where one end of the punching assembly is in transmission connection with the handle assembly, and the other end thereof is in transmission connection with the press-fit assembly. The handle assembly is pressed to sequentially drive the punching assembly and the press-fit assembly to move, so that punching and press-fitting are implemented synchronously.

In an implementation, the connecting assembly includes: a connecting block, where a shape of the connecting block is a U shape, and the press-fit assembly is movably disposed on the connecting block in a penetrating manner; and a magnet, fixedly disposed in the connecting block, where the support platform is detachably and magnetically connected to the magnet.

In an implementation, the connecting block is provided with a first mounting hole in a penetrating manner, and the magnet is fixedly disposed in the first mounting hole.

In an implementation, the connecting block is further provided with a first guide hole in a penetrating manner, the first guide hole is disposed opposite to the first mounting hole, and the press-fit assembly is movably disposed in the first guide hole in a penetrating manner.

In an implementation, the press-fit assembly includes: a guide rod, movably disposed in the first guide hole in a penetrating manner and being in transmission connection with the punching assembly; and a press-fit member, detachably disposed on the guide rod and disposed opposite to the support platform.

In an implementation, the press-fit member is detachably and threadedly connected to the guide rod, and a contact part between the press-fit member and the guide rod is provided with a gasket.

In an implementation, an inner wall, opposite to the press-fit member, of the guide rod is provided with an inner thread, and the press-fit member is detachably and threadedly connected to the inner thread.

In an implementation, the press-fit member includes: a press-fit block main body; and a connecting head and a press-fit head, respectively disposed at two opposite ends of the press-fit block main body, where the connecting head is provided with an outer thread, the outer thread is detachably and threadedly connected to the inner thread on the inner wall of the guide rod, and the press-fit head is disposed opposite to the support platform.

In an implementation, the guide rod is provided with a connecting hole in a penetrating manner, and one end of the punching assembly is disposed in the connecting hole.

In an implementation, the connecting block is provided with a second mounting hole, and one end of the punching assembly is movably connected to the second mounting hole.

In an implementation, the punching assembly includes: a pressing block main body, movably connected to the handle assembly, the connecting assembly, and the press-fit assembly respectively; and a punching rod, connected to the connecting assembly and penetrating through the pressing block main body.

In an implementation, a pressing head is disposed on the pressing block main body, and the pressing head is disposed in the connecting hole.

In an implementation, the pressing block main body is provided with a placing notch, two sides of the placing notch are provided with a second guide hole respectively, and the punching rod can be movably disposed in the second guide hole in a penetrating manner.

In an implementation, one end of the punching rod is movably connected to the second mounting hole through a connecting member.

In an implementation, the handle assembly includes: a first handle mechanism and a second handle mechanism, connected oppositely and movably; and a torsion spring, being in contact connection with the first handle mechanism and the second handle mechanism respectively.

In an implementation, the first handle mechanism and the second handle mechanism both include a handle structure and an outer housing; and the outer housing is a hollow cavity, and one side of the handle structure is disposed in the outer housing.

In an implementation, the handle structure includes: two handle plates, disposed oppositely; a plurality of spacing sleeves, respectively disposed between the two handle plates at intervals; and a plurality of fastening screws, respectively fixing two ends of each of the spacing sleeves to the two handle plates.

In an implementation, the outer housing is provided with a plurality of horizontal stripes.

Compared with the prior art, beneficial effects of the manual press-fit tool of the present invention are as follows:

According to the manual press-fit tool of the present invention, the connecting assembly limits and guides the press-fit assembly, so that concentricity of the press-fit assembly and the support platform matched to perform press-fitting is ensured. The support platform is detachably connected to the press-fit member, so that a matched press-fit assembly may be selected according to an actual requirement. Meanwhile, the punching assembly is disposed, and transmission is performed on the press-fit assembly through the punching assembly, so that punching and press-fitting are implemented. Therefore, a problem that an existing press-fit tool has a relatively single function is effectively solved.

BRIEF DESCRIPTION OF THE DRAWINGS

To describe the technical solutions in the embodiments of the present invention more clearly, the following briefly describes the accompanying drawings required for describing the embodiments. It should be understood that, the following accompanying drawings show merely some embodiments of the present invention, and therefore should not be regarded as a limitation on the scope. Those of ordinary skill in the art may still derive other related drawings from these accompanying drawings without creative efforts.

Figure 1:
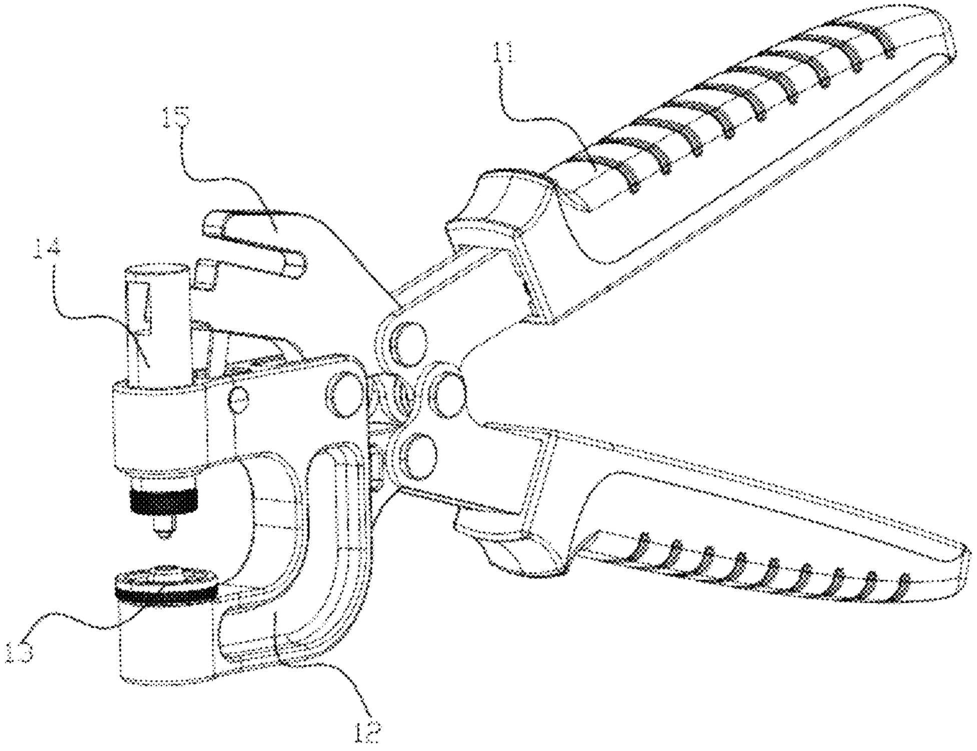
FIG. 1 is a schematic structural diagram of a manual press-fit tool of the present invention.

Reference numerals in the drawings: 10. manual press-fit tool; 11. handle assembly; 111. first handle mechanism; 1111. handle structure; 11111. handle plate; 11112. spacing sleeve; 11113. fastening screw; 11114. first through hole; 11115. first rotating shaft; 1112. outer housing; 11121. horizontal stripe; 112. second handle mechanism; 113. torsion spring; 1131. second rotating shaft; 12. connecting assembly; 121. connecting block; 1211. first mounting hole; 1212. first guide hole; 1213. second mounting hole; 1214. second through hole; 122. magnet; 13. support platform; 14. press-fit assembly; 141. guide rod; 1411. connecting hole; 1412. inner thread; 142. press-fit member; 1421. press-fit block main body; 1422. connecting head; 1423. press-fit head; 143. gasket; 15. punching assembly; 151. pressing block main body; 1511. pressing head; 1512. placing notch; 1513. second guide hole; 1514. third through hole; 152. punching rod; 1521. connecting member.

DETAILED DESCRIPTION OF THE EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. Assemblies of the embodiments of the present invention described and illustrated in the accompanying drawings can be arranged and designed in various different configurations.

Therefore, the detailed description of the embodiments of the present invention provided in the accompanying drawings is not intended to limit the claimed protection scope of the present invention, but only to represent selected embodiments of the present invention. Based on the embodiments in the present invention, all other embodiments obtained by those of ordinary skill in the art without making creative efforts shall fall within the protection scope of the present invention.

Figure 2:
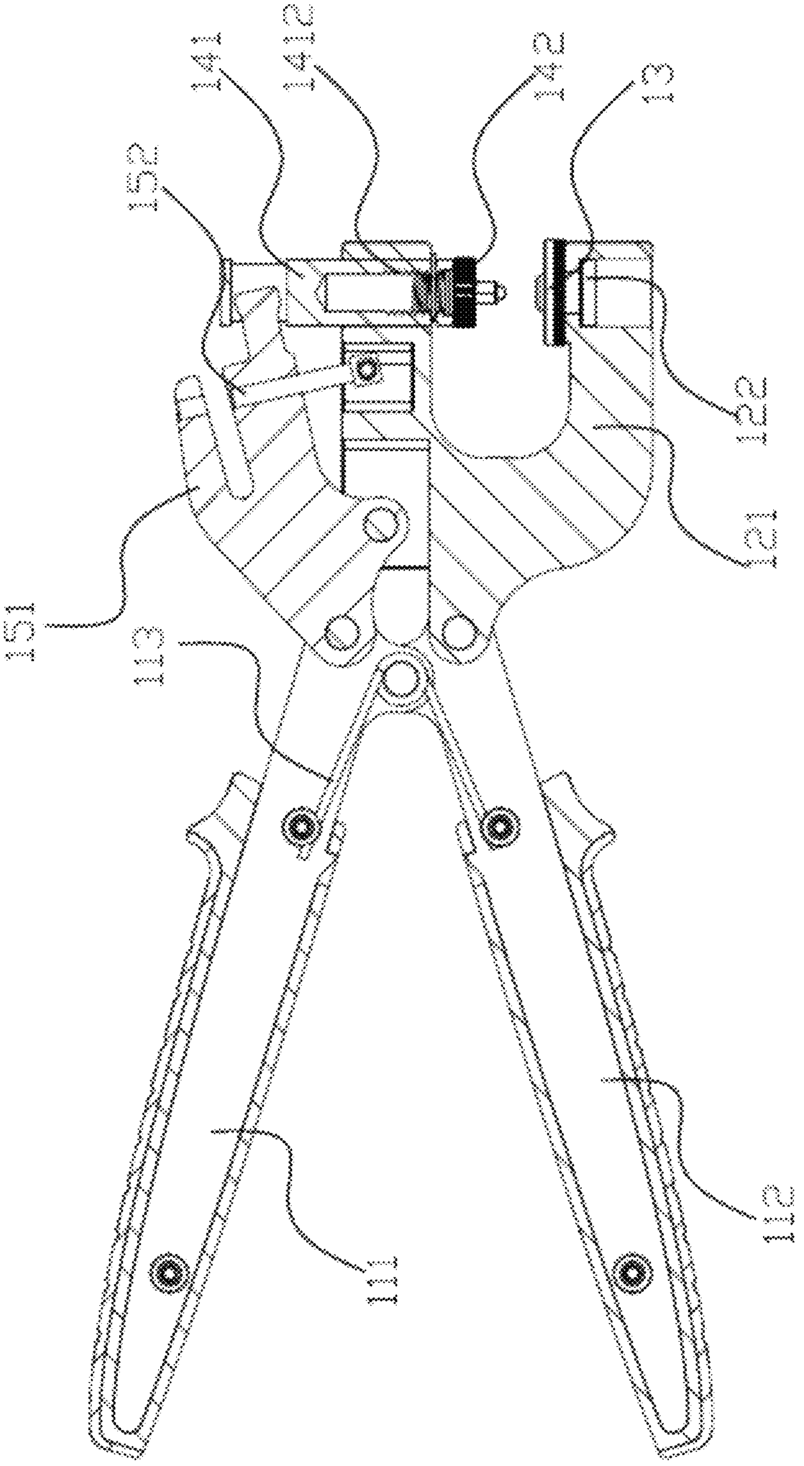
FIG. 2 is a schematic structural sectional view of a manual press-fit tool of the present invention shown in FIG. 1.
Figure 3:
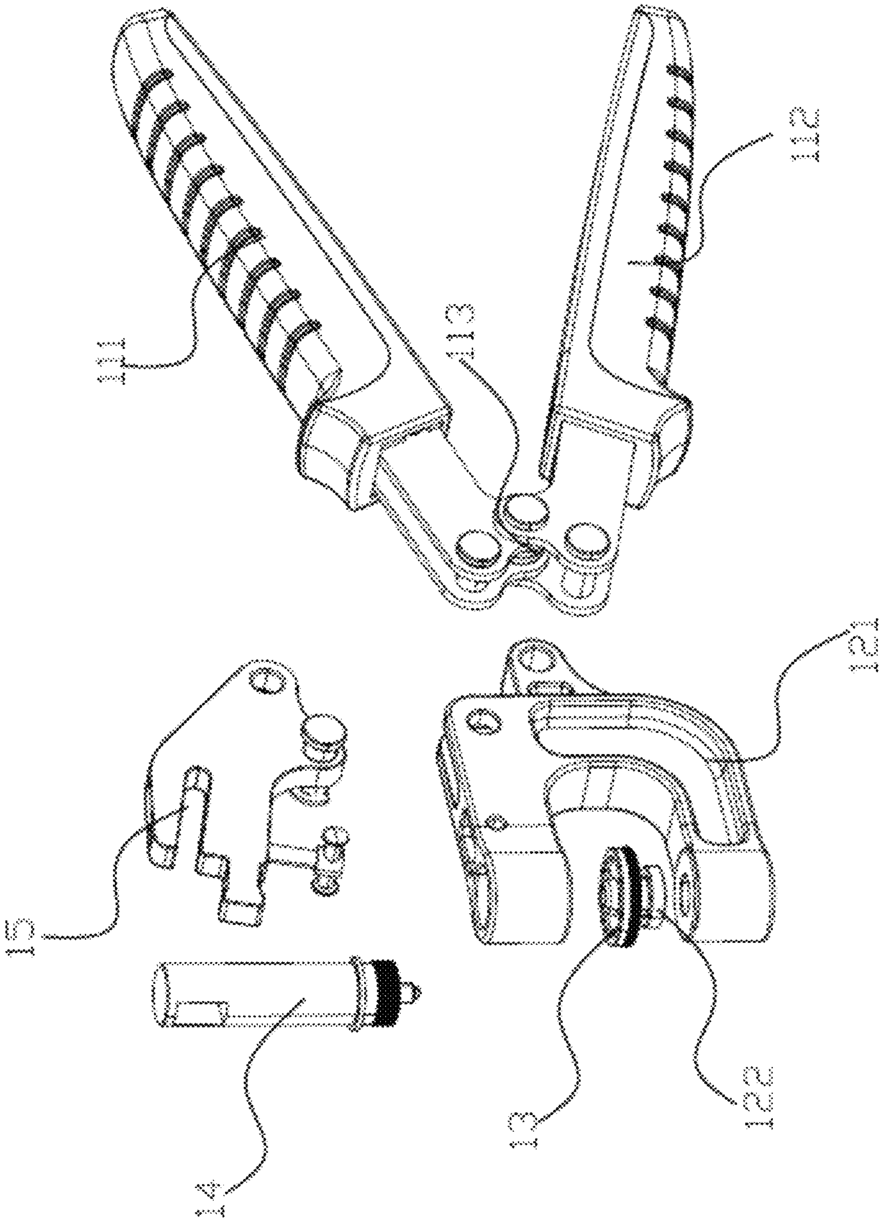
FIG. 3 is a schematic structural exploded view of a manual press-fit tool of the present invention shown in FIG. 1, including a handle assembly, a connecting assembly, a press-fit assembly, and a punching assembly.

Referring to FIG. 1 to FIG. 3, the present invention provides a manual press-fit tool 10, which mainly includes a handle assembly 11, a connecting assembly 12, a support platform 13, a press-fit assembly 14, and a punching assembly 15. The handle assembly 11 is a power main body, and the handle assembly 11 is pressed to provide press-fit force for the press-fit assembly 14 and the punching assembly 15 respectively. The connecting assembly 12 is connected to the handle assembly 11. The support platform 13 is detachably disposed on the connecting assembly 12, so that a matched support platform 13 may be replaced according to different requirements. The press-fit assembly 14 is movably disposed on the connecting assembly 12 in a penetrating manner and is disposed opposite to the support platform 13, and the connecting assembly 12 limits and guides the press-fit assembly 14, so that concentricity of the press-fit assembly 14 and the support platform 13 is ensured. One end of the punching assembly 15 is in transmission connection with the handle assembly 11, the other end thereof is in transmission connection with the press-fit assembly 14, and the handle assembly 11 is pressed to sequentially drive the punching assembly 15 and the press-fit assembly 14 to move, so that punching and press-fitting are implemented synchronously.

Figure 4:
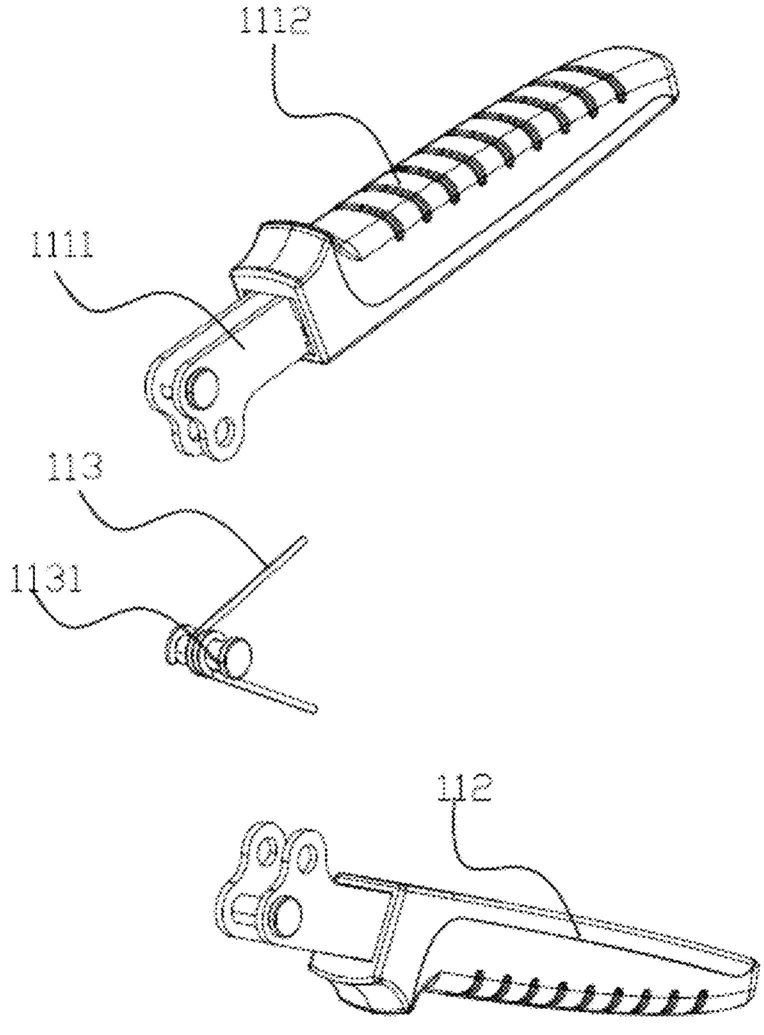
FIG. 4 is a schematic structural exploded view of a handle assembly shown in FIG. 3, including a first handle.

Referring to FIG. 1 and FIG. 4, in the embodiment, the handle assembly 11 includes a first handle mechanism 111, a second handle mechanism 112, and a torsion spring 113. The first handle mechanism 111 is oppositely and movably connected to the second handle mechanism 112. The torsion spring 113 is in contact connection with the first handle mechanism 111 and the second handle mechanism 112 respectively and provides restoring force for the first handle mechanism 111 and the second handle mechanism 112 synchronously. When external force applied to the first handle mechanism 111 and the second handle mechanism 112 disappears, the torsion spring 113 provides the restoring force for the first handle mechanism 111 and the second handle mechanism 112 respectively to restore to an initial position. Specifically, the torsion spring 113 is disposed on a second rotating shaft 1131, and the torsion spring and the second rotating shaft are in contact connection with the first handle mechanism 111 and the second handle mechanism 112 respectively. One end of each of the first handle mechanism 111 and the second handle mechanism 112 is also movably disposed on the second rotating shaft 1131 in a penetrating manner respectively.

Figure 5:
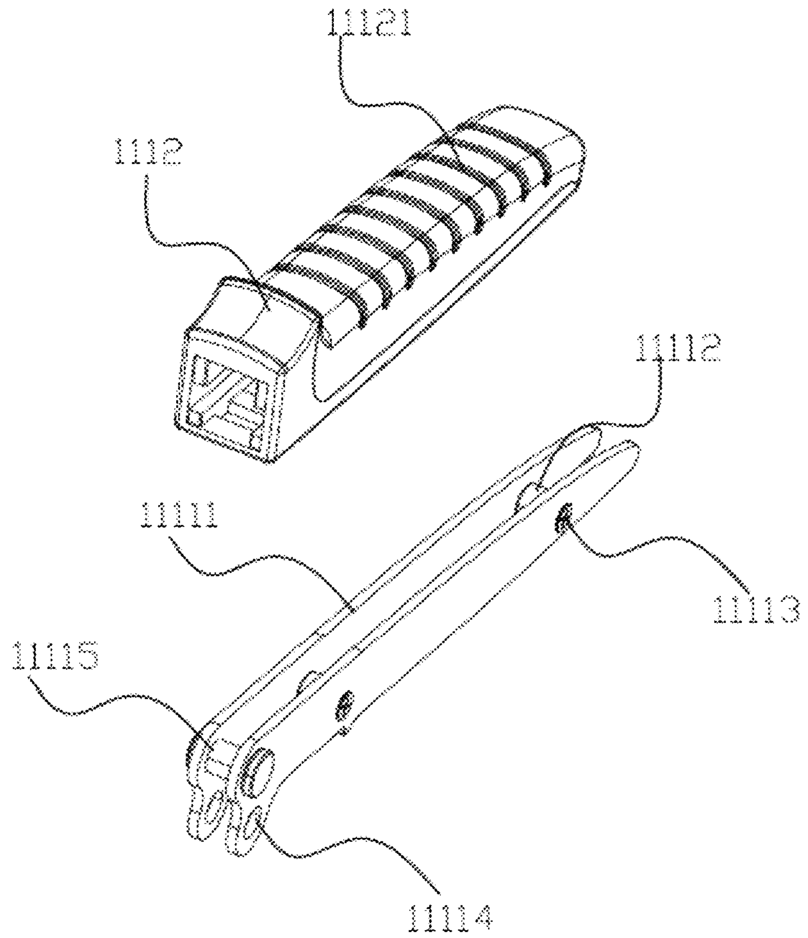
FIG. 5 is a schematic structural exploded view of a first handle mechanism shown in FIG. 4.
Figure 6:
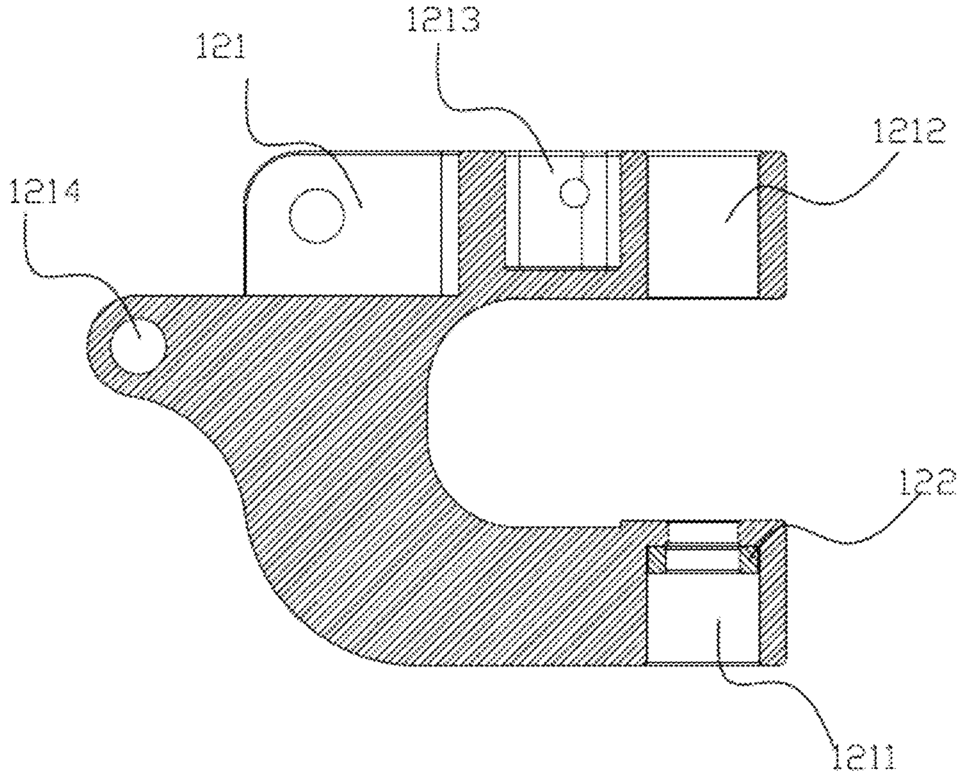
FIG. 6 is a schematic structural sectional view of a connecting assembly shown in FIG. 3.

Referring to FIG. 4 and FIG. 5, in the embodiment, the first handle mechanism 111 includes a handle structure 1111 and an outer housing 1112. The outer housing 1112 is a hollow cavity, and one side of the handle structure 1111 is disposed in the outer housing 1112. Specifically, the handle structure 1111 includes two handle plates 11111, a plurality of spacing sleeves 11112, and a plurality of fastening screws 11113. The two handle plates 11111 are disposed oppositely. The plurality of spacing sleeves 11112 are respectively disposed between the two handle plates 11111 at intervals. The plurality of fastening screws 11113 respectively fix two ends of each of corresponding spacing sleeves 11112 to the two handle plates 11111. The handle plates 11111 are provided with a plurality of first through holes 11114 in a penetrating manner, a first rotating shaft 11115 is disposed on a corresponding first through hole 11114 in a penetrating manner, and the punching assembly 15 is movably connected to the first handle mechanism 111 through the first rotating shaft 11115. The outer housing 1112 is provided with a plurality of horizontal stripes 11121, and friction force between a palm of a user and the outer housing is increased through the plurality of horizontal stripes 11121. In the embodiment, a structure of the second handle mechanism 112 is similar to a structure of the first handle mechanism 111, and therefore, a specific structure thereof is not described in detail herein.

Referring to FIG. 1, FIG. 2, FIG. 3, and FIG. 6, in the embodiment, the connecting assembly 12 includes a connecting block 121 and a magnet 122. A shape of the connecting block 121 is a U shape, and the press-fit assembly 14 is movably disposed on the connecting block 121 in a penetrating manner. The magnet 122 is fixedly disposed in the connecting block 121, and the support platform 13 is detachably and magnetically connected to the magnet 122, so that the support platform 13 is detachably disposed on the connecting block 121, and a matched support platform 13 may be replaced according to different requirements. Specifically, the connecting block 121 is provided with a first mounting hole 1211 and a first guide hole 1212 respectively in a penetrating manner, the magnet 122 is fixedly disposed in the first mounting hole 1211, the first guide hole 1212 is disposed opposite to the first mounting hole 1211, the press-fit assembly 14 is movably disposed in the first guide hole 1212 in a penetrating manner, and the first guide hole 1212 guides the press-fit assembly 14, so that the press-fit assembly 14 moves longitudinally and straightly, and press-fit concentricity is ensured. The connecting block 121 is provided with a second mounting hole 1213, and one end of the punching assembly 15 is movably connected to the second mounting hole 1213. The connecting block 121 is further provided with a plurality of through holes 1214 in a penetrating manner, and the handle assembly 11 and the punching assembly 15 are movably connected to the connecting block 121 respectively through corresponding through holes 1214.

Referring to FIG. 1, FIG. 2, FIG. 3, and FIG. 7, in the embodiment, the press-fit assembly 14 includes a guide rod 141 and a press-fit member 142. The guide rod 141 is movably disposed in the first guide hole 1212 in a penetrating manner and is in transmission connection with the punching assembly 15, and the punching assembly 15 drives the guide rod 141 to move in the first guide hole 1212. The press-fit member 142 is detachably disposed on the guide rod 141 and can be disposed opposite to the support platform 13, the punching assembly 15 drives the press-fit member 142 to move in a direction toward the support platform 13 through the guide rod 141, and the press-fit member 142 and the support platform 13 are matched to implement press-fitting. Specifically, the press-fit member 142 is detachably and threadedly connected to the guide rod 141, and a contact part between the press-fit member and the guide rod is provided with a gasket 143.

Figure 7:
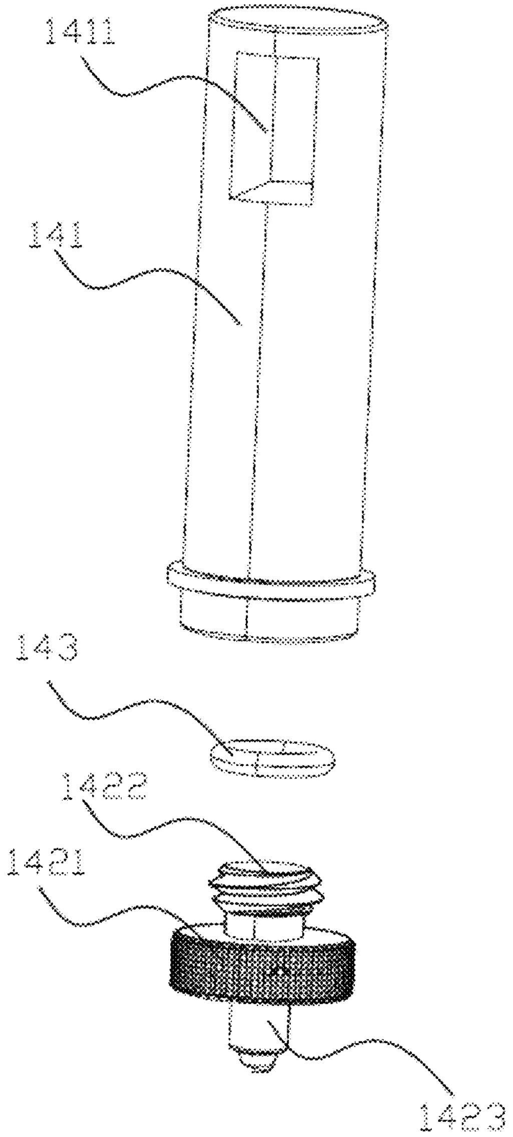
FIG. 7 is a schematic structural exploded view of a press-fit assembly shown in FIG. 3.

Referring to FIG. 7, specifically, the guide rod 141 is provided with a connecting hole 1411 in a penetrating manner, and one end of the punching assembly 15 is disposed in the connecting hole 1411, so that the guide rod 141 is guided. An inner wall, opposite to the press-fit member 142, of the guide rod 141 is provided with an inner thread 1412, and the press-fit member 142 is detachably and threadedly connected to the inner thread 1412, so that the guide rod 141 is detachably and fixedly connected, and a matched press-fit member 142 may be replaced according to different requirements. Specifically, the press-fit member 142 includes a press-fit block main body 1421, a connecting head 1422, and a press-fit head 1423. The connecting head 1422 and the press-fit head 1423 are respectively disposed at two opposite ends of the press-fit block main body 1421. The connecting head 1422 is provided with an outer thread and is detachably and threadedly connected to the guide rod 141. The press-fit head 1423 is disposed opposite to the support platform 13, and the press-fit head 1423 and the support platform 13 are matched to implement press-fitting.

Referring to FIG. 1, FIG. 2, FIG. 3, and FIG. 8, in the embodiment, the punching assembly 15 includes a pressing block main body 151 and a punching rod 152. The pressing block main body 151 is movably connected to the handle assembly 11, the connecting assembly 12, and the press-fit assembly 14 respectively. One end of the punching rod 152 is connected to the connecting assembly 12 and penetrates through the pressing block main body 151, and an object disposed on the pressing block main body 151 is punched through the punching rod 152.

Figure 8:
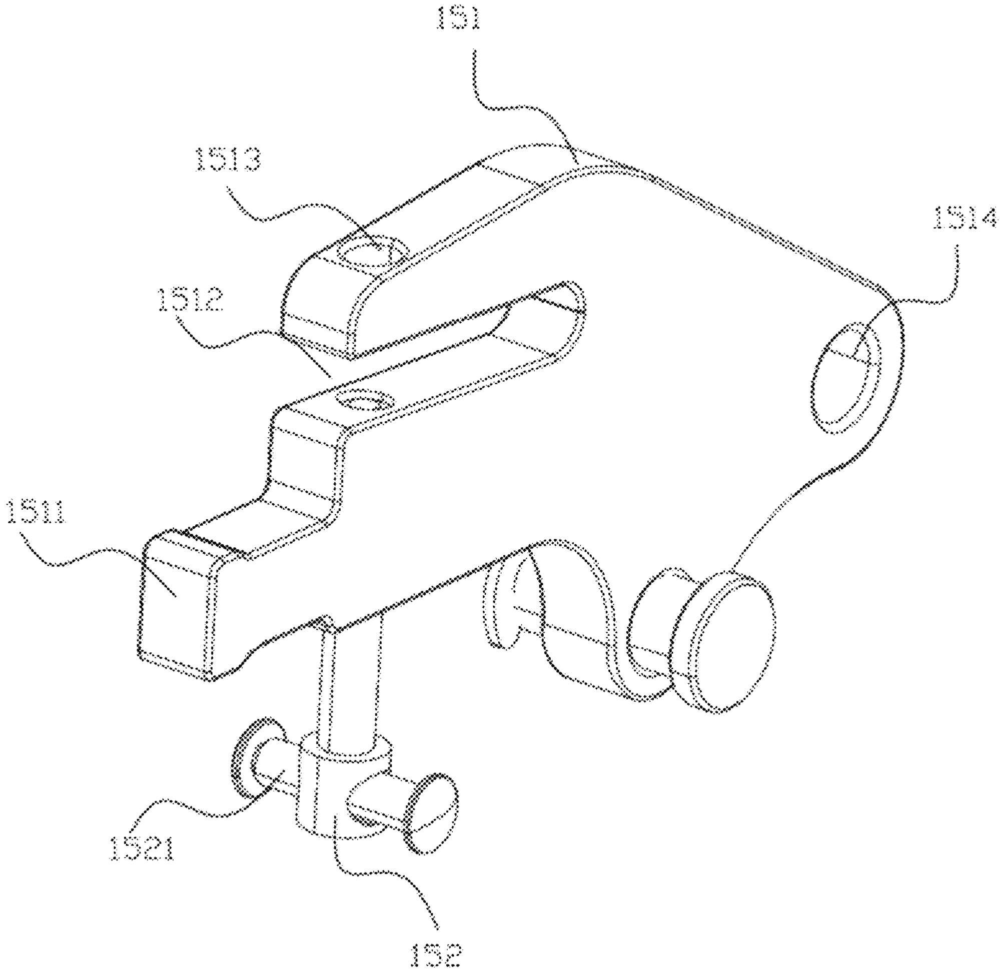
FIG. 8 is a schematic structural diagram of a punching assembly shown in FIG. 3.

Referring to FIG. 8, specifically, a pressing head 1511 is disposed on the pressing block main body 151 and is disposed in the connecting hole 1411, so that transmission connection of the guide rod 141 is implemented. The pressing block main body 151 is provided with a placing notch 1512, and an object that needs to be punched is placed on the placing notch 1512 for punching. Two sides of the placing notch 1512 are provided with a second guide hole 1513 respectively, the punching rod 152 can be movably disposed in the second guide hole 1513 in a penetrating manner, and movement of the punching rod 152 is guided through the second guide hole 1513. The pressing block main body 151 is further provided with a plurality of third through holes 1514 in a penetrating manner, and the pressing block main body 151 is movably connected to the handle assembly 11 and the connecting assembly 12 respectively through a corresponding third through hole 1514. Specifically, one end of the punching rod 152 is movably connected to the second mounting hole 1213 through a connecting member 1521.

It should be noted that a specific working process of the manual press-fit tool 10 of the present invention is as follows: The support platform 13 and the press-fit member 142 that are adapted are selected according to an object that needs to be press-fitted, the support platform 13 is detachably and fixedly connected to the connecting block 121 through a magnetic action of the magnet 122, and the press-fit member 142 is detachably and threadedly connected to the guide rod 141 at the same time. Then, the object that needs to be press-fitted is placed on the support platform 13, by pressing the handle assembly 11, the guide rod 141 and the press-fit member 142 are sequentially driven to move toward the object that needs to be press-fitted on the support platform 13 through a transmission action of the punching assembly 15, and the press-fit member 142 and the support platform 13 are matched to implement manual press-fitting. When punching is needed, an object that needs to be punched is placed on the placing notch 1512, and the handle assembly 11 is pressed to drive the punching rod 152 to move, so that punching is implemented.

The technical features of the above embodiments can be combined in any way. To simplify the description, not all possible combinations of the technical features in the embodiments are described. However, as long as there is no contradiction in the combinations of these technical features, all possible combinations should be considered to fall within the scope of the specification.

The above embodiments only represent several implementations of the present invention, and the description thereof is relatively specific and detailed but should not be construed as limiting the scope of the present invention. It should be noted that for those of ordinary skill in the art, several modifications and improvements can be made without departing from the concept of the present invention, and these modifications and improvements should all fall within the protection scope of the present invention. Therefore, the protection scope of the present invention shall be subject to the appended claims.

What is claimed is:

1. A manual press-fit tool, comprising:
- a handle assembly;
- a connecting assembly, connected to the handle assembly;
- a support platform, detachably disposed on the connecting assembly;
- a press-fit assembly, movably disposed on the connecting assembly in a penetrating manner and disposed opposite to the support platform, wherein the connecting assembly limits and guides the press-fit assembly; and
- a punching assembly, wherein one end of the punching assembly is in transmission connection with the handle assembly, another end of the punching assembly is in transmission connection with the press-fit assembly, and the handle assembly is pressed to sequentially drive the punching assembly and the press-fit assembly to move, so that punching and press-fitting are implemented synchronously.

2. The manual press-fit tool according to claim 1, wherein the connecting assembly comprises: a connecting block, wherein a shape of the connecting block is a U shape, and the press-fit assembly is movably disposed on the connecting block in a penetrating manner; and a magnet, fixedly disposed in the connecting block, wherein the support platform is detachably and magnetically connected to the magnet.

3. The manual press-fit tool according to claim 2, wherein the connecting block is provided with a first mounting hole in a penetrating manner, and the magnet is fixedly disposed in the first mounting hole.

4. The manual press-fit tool according to claim 3, wherein the connecting block is further provided with a first guide hole in a penetrating manner, the first guide hole is disposed opposite to the first mounting hole, and the press-fit assembly is movably disposed in the first guide hole in a penetrating manner.

5. The manual press-fit tool according to claim 4, wherein the press-fit assembly comprises: a guide rod, movably disposed in the first guide hole in a penetrating manner and being in transmission connection with the punching assembly; and a press-fit member, detachably disposed on the guide rod and disposed opposite to the support platform.

6. The manual press-fit tool according to claim 5, wherein the press-fit member is detachably and threadedly connected to the guide rod, and a contact part between the press-fit member and the guide rod is provided with a gasket.

7. The manual press-fit tool according to claim 6, wherein the press-fit member comprises: a press-fit block main body; and a connecting head and a press-fit head, respectively disposed at two opposite ends of the press-fit block main body, wherein the connecting head is provided with an outer thread, the outer thread is detachably and threadedly connected to the inner thread on the inner wall of the guide rod, and the press-fit head is disposed opposite to the support platform.

8. The manual press-fit tool according to claim 7, wherein a pressing head is disposed on the pressing block main body, and the pressing head is disposed in a connecting hole of the guide rod.

9. The manual press-fit tool according to claim 5, wherein the punching assembly comprises: a pressing block main body, movably connected to the handle assembly, the connecting assembly, and the press-fit assembly respectively; and a punching rod, connected to the connecting assembly and penetrating through the pressing block main body.

10. The manual press-fit tool according to claim 1, wherein the handle assembly comprises: a first handle mechanism and a second handle mechanism, connected oppositely and movably; and a torsion spring, being in contact connection with the first handle mechanism and the second handle mechanism respectively.

* * * * *